US011091632B2

(12) United States Patent
Andrews et al.

(10) Patent No.: US 11,091,632 B2
(45) Date of Patent: Aug. 17, 2021

(54) POLYMER BLENDS WITH CONTROLLABLE BIODEGRADATION RATES

(71) Applicant: CJ CHEILJEDANG CORPORATION, Seoul (KR)

(72) Inventors: Michael Andrews, Beverly, MA (US); Allen R. Padwa, Worcester, MA (US); David R. Scarlett, Clinton, MA (US)

(73) Assignee: CJ CHEILJEDANG CORPORATION, Seoul (KR)

( * ) Notice: Subject to any disclaimer, the term of this patent is extended or adjusted under 35 U.S.C. 154(b) by 125 days.

(21) Appl. No.: 15/776,744

(22) PCT Filed: Nov. 17, 2016

(86) PCT No.: PCT/US2016/062507
§ 371 (c)(1),
(2) Date: May 16, 2018

(87) PCT Pub. No.: WO2017/087658
PCT Pub. Date: May 26, 2017

(65) Prior Publication Data
US 2018/0334564 A1   Nov. 22, 2018

Related U.S. Application Data

(60) Provisional application No. 62/256,265, filed on Nov. 17, 2015.

(51) Int. Cl.
C08L 67/04 (2006.01)
C08L 67/02 (2006.01)
C08K 3/26 (2006.01)

(52) U.S. Cl.
CPC ............... *C08L 67/04* (2013.01); *C08K 3/26* (2013.01); *C08L 67/02* (2013.01); *C08K 2003/265* (2013.01)

(58) Field of Classification Search
CPC .................................................... C08L 67/04
See application file for complete search history.

(56) References Cited

U.S. PATENT DOCUMENTS

| | | |
|---|---|---|
| 3,904,579 A | 9/1975 | Braddicks |
| 4,477,654 A | 10/1984 | Holmes et al. |
| 5,281,691 A | 1/1994 | Hubbs et al. |
| 5,391,423 A | 2/1995 | Wnuk et al. |
| 5,391,708 A | 2/1995 | Hubbs et al. |
| 5,462,983 A | 10/1995 | Bloembergen et al. |
| 5,625,029 A | 4/1997 | Hubbs et al. |
| 5,646,217 A | 7/1997 | Hammond |
| 5,756,651 A | 5/1998 | Chen et al. |
| 5,849,374 A | 12/1998 | Gruber et al. |
| 5,849,401 A | 12/1998 | El-Afandi et al. |
| 5,883,199 A | 3/1999 | McCarthy et al. |
| 5,939,467 A | 8/1999 | Wnuk et al. |
| 5,973,100 A | 10/1999 | Asrar et al. |
| 5,994,478 A | 11/1999 | Asrar et al. |
| 6,096,810 A | 8/2000 | Asrar et al. |
| 6,156,852 A | 12/2000 | Asrar et al. |
| 6,191,203 B1 | 2/2001 | Asrar et al. |
| 6,201,083 B1 | 3/2001 | Asrar et al. |
| 6,312,823 B1 | 11/2001 | El-Afandi et al. |
| 6,342,304 B1 | 1/2002 | Buchanan et al. |
| 6,562,938 B2 | 5/2003 | Haile et al. |
| 6,573,340 B1 | 6/2003 | Khemani et al. |
| 6,579,932 B1 | 6/2003 | Schipper et al. |
| 6,579,934 B1 | 6/2003 | Wang et al. |
| 6,645,618 B2 | 11/2003 | Hobbs et al. |
| 6,669,771 B2 | 12/2003 | Tokiwa et al. |
| 6,703,115 B2 | 3/2004 | Hale et al. |
| 6,794,023 B1 | 9/2004 | Melik et al. |
| 6,821,612 B1 | 11/2004 | Melik et al. |
| 6,838,403 B2 | 1/2005 | Tsai et al. |
| 6,890,649 B2 | 5/2005 | Hobbs et al. |
| 6,890,989 B2 | 5/2005 | Wang et al. |
| 7,098,292 B2 | 8/2006 | Zhao et al. |
| 7,144,632 B2 | 12/2006 | Hayes |
| 7,160,977 B2 | 1/2007 | Hale et al. |
| 7,169,860 B2 | 1/2007 | Bastioli et al. |
| 7,172,814 B2 | 2/2007 | Hodson |
| 7,186,789 B2 | 3/2007 | Hossainy et al. |
| 7,202,289 B2 | 4/2007 | Nozaki et al. |
| 7,212,414 B2 | 5/2007 | Baarman |
| 7,214,414 B2 | 5/2007 | Khemani et al. |

(Continued)

FOREIGN PATENT DOCUMENTS

| | | |
|---|---|---|
| CN | 1476467 A | 2/2004 |
| CN | 1771291 A | 5/2006 |
| CN | 1772810 A | 5/2006 |
| CN | 101205356 A | 6/2008 |
| CN | 101265356 A | 9/2008 |
| CN | 102459462 A | 5/2012 |
| CN | 103665688 A | 3/2014 |
| CN | 104379671 A | 2/2015 |
| CN | 104428369 A | 3/2015 |
| EP | 0052460 B1 | 2/1985 |

(Continued)

OTHER PUBLICATIONS

Final Office Action for U.S. Appl. No. 13/698,229, "Toughening Polylactic Acid With Polyhydroxyalkanoates," dated Sep. 11, 2015.
Final Office Action for U.S. Appl. No. 14/702,437, "PHA Compositions Comprising PBS and PBSA and Methods for Their Production," dated Jun. 17, 2016.

(Continued)

*Primary Examiner* — Callie E Shosho
*Assistant Examiner* — John Vincent Lawler
(74) *Attorney, Agent, or Firm* — Christensen, Fonder, Dardi & Herbert PLLC; Diane E. Bennett; Peter S. Dardi

(57) ABSTRACT

Biodegradable compositions of polybutylene-succinate (PBS) or polybutylene-succinate-adipate (PBS A) with biobased 3-hydroxybutyrate copolymers are described. In certain embodiments, the copolymer increases the biodegradation rate of the PBS or PBSA. Methods of making the compositions of the invention are also described. The invention also includes articles, films and laminates comprising the compositions.

16 Claims, No Drawings

(56) References Cited

U.S. PATENT DOCUMENTS

| | | |
|---|---|---|
| 7,241,832 B2 | 7/2007 | Khemani et al. |
| 7,264,641 B2 | 9/2007 | Prasad |
| 7,297,394 B2 | 11/2007 | Khemani et al. |
| 7,344,034 B2 | 3/2008 | Heinrich et al. |
| 7,344,784 B2 | 3/2008 | Hodson |
| 7,354,653 B2 | 4/2008 | Germroth et al. |
| 7,368,503 B2 | 5/2008 | Hale |
| 7,368,511 B2 | 5/2008 | Hale et al. |
| 7,449,510 B2 | 11/2008 | Ueda et al. |
| 7,491,213 B2 | 2/2009 | Perreault et al. |
| 7,579,413 B2 | 8/2009 | Mohanty et al. |
| 7,619,025 B2 | 11/2009 | Mohanty et al. |
| 7,678,444 B2 | 3/2010 | Tedford, Jr. et al. |
| 7,718,720 B2 | 5/2010 | Padwa |
| 7,803,298 B2 | 9/2010 | Kanazawa |
| 7,807,773 B2 | 10/2010 | Matsuoka et al. |
| 7,846,987 B2 | 12/2010 | Handa |
| 8,062,476 B2 | 11/2011 | Patel et al. |
| 8,193,298 B2 | 6/2012 | Bastioli et al. |
| 8,231,954 B2 | 7/2012 | Li et al. |
| 8,524,856 B2 | 9/2013 | Krishnaswamy et al. |
| 8,629,212 B2 | 1/2014 | Krishnaswamy et al. |
| 9,056,947 B2 | 6/2015 | Krishnaswamy et al. |
| 9,328,239 B2 | 5/2016 | Krishnaswamy |
| 9,353,258 B2 | 5/2016 | Krishnaswamy et al. |
| 9,650,513 B2 | 5/2017 | Krishnaswamy et al. |
| 2002/0143136 A1* | 10/2002 | Noda ............ B32B 27/20 528/272 |
| 2002/0164729 A1 | 11/2002 | Skraly et al. |
| 2003/0181555 A1 | 9/2003 | Figuly |
| 2004/0166758 A1 | 8/2004 | Reichmann et al. |
| 2004/0213941 A1 | 10/2004 | Whitehouse |
| 2004/0220355 A1* | 11/2004 | Whitehouse ............ C08K 5/34 525/436 |
| 2004/0225269 A1 | 11/2004 | Zhao et al. |
| 2005/0054813 A1 | 3/2005 | Bastioli et al. |
| 2005/0101228 A1 | 5/2005 | Prasad |
| 2005/0107505 A1 | 5/2005 | Shinoda et al. |
| 2005/0136155 A1 | 6/2005 | Jordan et al. |
| 2005/0137304 A1 | 6/2005 | Strand et al. |
| 2005/0137356 A1 | 6/2005 | Hale et al. |
| 2005/0143502 A1 | 6/2005 | Yamada et al. |
| 2005/0154114 A1 | 7/2005 | Hale |
| 2005/0182204 A1* | 8/2005 | Otome ............ B29C 48/912 525/437 |
| 2005/0209377 A1 | 9/2005 | Padwa |
| 2006/0047026 A1 | 3/2006 | Yamada et al. |
| 2006/0159918 A1 | 7/2006 | Dugan et al. |
| 2006/0183205 A1 | 8/2006 | Masaro et al. |
| 2006/0247387 A1 | 11/2006 | Mohanty et al. |
| 2007/0027247 A1 | 2/2007 | Ueda et al. |
| 2007/0088099 A1 | 4/2007 | Mentink et al. |
| 2007/0203261 A1 | 8/2007 | Narayan et al. |
| 2007/0228046 A1 | 10/2007 | Bastioli et al. |
| 2008/0027178 A1 | 1/2008 | Uradnisheck |
| 2008/0081882 A1 | 4/2008 | Tian et al. |
| 2008/0255267 A1 | 10/2008 | Domb et al. |
| 2008/0281018 A1 | 11/2008 | Seeliger et al. |
| 2008/0311813 A1 | 12/2008 | Ting et al. |
| 2009/0018235 A1 | 1/2009 | Nascimento et al. |
| 2009/0123728 A1 | 5/2009 | Cheung et al. |
| 2009/0148656 A1 | 6/2009 | Hsu |
| 2009/0149570 A1 | 6/2009 | Cheng et al. |
| 2009/0179069 A1 | 7/2009 | Schmidt et al. |
| 2009/0191371 A1 | 7/2009 | Uradnisheck |
| 2009/0215914 A1 | 8/2009 | Hirose et al. |
| 2009/0234035 A1 | 9/2009 | Cheung et al. |
| 2009/0247667 A1 | 10/2009 | Yao et al. |
| 2009/0286075 A1 | 11/2009 | Nakamura et al. |
| 2010/0041835 A1 | 2/2010 | Scherzer et al. |
| 2010/0048767 A1 | 2/2010 | Nascimento et al. |
| 2010/0071170 A1 | 3/2010 | Burout et al. |
| 2010/0076099 A1 | 3/2010 | Mohanty et al. |
| 2010/0089289 A1 | 4/2010 | Mahiat et al. |
| 2010/0193146 A1 | 8/2010 | Patel |
| 2010/0305280 A1 | 12/2010 | Whitehouse |
| 2010/0330382 A1 | 12/2010 | Dou et al. |
| 2011/0124779 A1 | 5/2011 | Whitehouse et al. |
| 2011/0135863 A1 | 6/2011 | Li et al. |
| 2011/0189414 A1 | 8/2011 | Whitehouse |
| 2011/0251349 A1 | 10/2011 | Padwa et al. |
| 2011/0293865 A1 | 12/2011 | Padwa et al. |
| 2012/0107630 A1 | 5/2012 | Krishnaswamy et al. |
| 2012/0108743 A1* | 5/2012 | Krishnaswamy ....... B32B 27/08 524/599 |
| 2013/0065046 A1 | 3/2013 | Krishnaswamy |
| 2013/0317163 A1 | 11/2013 | Krishnaswamy et al. |
| 2015/0132512 A1 | 5/2015 | Krishnaswamy et al. |
| 2015/0147929 A1* | 5/2015 | Krishnaswamy ........ C08J 3/246 442/199 |
| 2015/0203674 A1 | 7/2015 | Weinlein et al. |

FOREIGN PATENT DOCUMENTS

| | | |
|---|---|---|
| EP | 0 648 238 B1 | 9/1999 |
| EP | 1911809 A1 | 4/2008 |
| EP | 1 944 333 A1 | 7/2008 |
| EP | 1950053 A1 | 7/2008 |
| EP | 2060605 A1 | 5/2009 |
| JP | 2003092926 A | 4/2003 |
| JP | 2007-161957 A | 6/2007 |
| WO | WO-1999/14268 A1 | 3/1999 |
| WO | WO-99/23161 A2 | 5/1999 |
| WO | WO 1999/23161 * | 5/1999 |
| WO | WO-2002/34857 A2 | 5/2002 |
| WO | WO-02/059201 A1 | 8/2002 |
| WO | WO-2004/076582 A1 | 9/2004 |
| WO | WO-2005/063881 A1 | 7/2005 |
| WO | WO-2006/012670 A1 | 2/2006 |
| WO | WO-2006/087346 A1 | 8/2006 |
| WO | WO-2007/099056 A1 | 9/2007 |
| WO | WO-2008/007919 A1 | 1/2008 |
| WO | WO-2008/037985 A1 | 4/2008 |
| WO | WO-2008/130225 A2 | 10/2008 |
| WO | WO-2009/032864 A1 | 3/2009 |
| WO | WO-2009/137058 A1 | 11/2009 |
| WO | WO-2010/151798 A2 | 12/2010 |
| WO | WO-2010/151811 A2 | 12/2010 |
| WO | WO-2011/146484 A2 | 11/2011 |
| WO | WO-2011/160053 A2 | 12/2011 |
| WO | 2013-017431 A1 | 2/2013 |
| WO | WO-2013/0184822 A1 | 12/2013 |
| WO | WO-2013/0184836 A1 | 12/2013 |
| WO | WO-2014017715 A1 | 1/2014 |
| WO | WO 2014/058655 * | 4/2014 |
| WO | WO-2014058655 A1 | 4/2014 |
| WO | WO-2015/149029 A1 | 10/2015 |

OTHER PUBLICATIONS

Final Rejection for U.S. Appl. No. 14/406,131, "Biobased Rubber Modified Biodegradable Polymer Blends," dated Mar. 2, 2018.

Non-Final Office Action for U.S. Appl. 13/380,444, "Branched Aliphatic-Aromatic Polyester Blends," dated Jun. 24, 2014.

Non-Final Office Action for U.S. Appl. No. 13/698,229, "Toughening Polylactic Acid With Polyhydroxyalkanoates," dated Mar. 27, 2015.

Non-Final Office Action for U.S. Appl. No. 14/150,451, "PHA Compositions Comprising PBS and PBSA and Methods for Their Production," dated Sep. 2, 2014.

Non-Final Office Action for U.S. Appl. No. 14/702,437, "PHA Compositions Comprising PBS and PBSA and Methods for Their Production," dated Nov. 30, 2015.

Notice of Allowance and Fees Due, U.S. Appl. No. 13/959,715, dated Sep. 10, 2013.

Notice of Allowance for U.S. Appl. No. 13/380,483, "PHA Compositions Comprising PBS and PBSA and Methods for Their Production," dated May 3, 2013.

Notice of Allowance for U.S. Appl. No. 13/698,229, "Toughening Polylactic Acid With Polyhydroxyalkanoates," dated Dec. 24, 2015.

(56) References Cited

OTHER PUBLICATIONS

Notice of Allowance for U.S. Appl. No. 14/150,451, "PHA Compositions Comprising PBS and PBSA and Methods for Their Production," dated Feb. 12, 2015.
Notice of Allowance for U.S. Appl. No. 14/406,135, "Low Glass Transition Polyhydroxyalkanoates for Modification of Biodegradable Polymers," dated Feb. 1, 2016.
Notice of Allowance for U.S. Appl. No. 14/406,135, "Low Glass Transition Polyhydroxyalkanoates for Modification of Biodegradable Polymers," dated Nov. 10, 2015.
Notice of Allowance for U.S. Appl. No. 14/702,437, "PHA Compositions Comprising PBS and PBSA and Methods for Their Production," dated Jun. 17, 2016.
Requirement for Restriction for U.S. Appl. No. 14/406,131, "Biobased Rubber Modified Biodegradable Polymer Blends," dated May 5, 2017.
Braunegg, "Polyhydroxyalkanoates, biopolyesters from renewable resources: Physiological and engineering aspects," J Biotechnol, 65(2-3):127-161 (1998).
D'Haene et al., "Preparation and Characterization of a Branched Bacterial Polyester", Macromolecules, ACS 32(16): 5229-5235 (1999).
Eubeler et al., "Environmental biodegradation of synthetic polymers II Biodegradation of different polymer groups," TrAC, 29(1):84-100 (2010).
International Preliminary Report on Patentability for International Application No. PCT/US2015/023186 dated Sep. 27, 2016.
International Preliminary Report on Patentability for International Application No. PCT/US2016/062507 dated May 22, 2018.
International Preliminary Report on Patentability, International Application No. PCT/US2011/036808, filed May 17, 2011, entitled "Toughening Polylactic Acid With Polyhydroxyalkanoates", Date of Communication: Nov. 20, 2012.
International Search Report and Written Opinion for International Application No. PCT/US2015/023186 dated Jul. 1, 2015.
International Search Report and Written Opinion for International Application No. PCT/US2016/062507 dated Feb. 16, 2017.
International Search Report for Int'l Application No. PCT/US2010/040037; dated Feb. 1, 2011.
International Search Report for Int'l Application No. PCT/US2010/040056; dated Feb. 1, 2011.
International Search Report, International Application No. PCT/US2011/036808, Date of Search: Jan. 17, 2012.
Ishida et al., "Comonomer Unit Composition and Thermal Properties of Poly(3-hydroxybutyrate-co-4-hydroxybutyrate)s Biosynthesized by Ralstonia Eutropha", Biomacromolecules, 2:1285-1293 (2001).
Lee et al., "Production of poly(3-hydroxybutyrate-co-3-hydroxyhexanoate) by high-cell-density cultivation of Aeromonas hydrophila," Biotechnol Bioeng, 67(2):240-244 (2000).
Lee, "Bacterial polyhydroxyalkanoates," Biotechnol Bioeng, 49(1):1-14 (1996).
Madison et al., "Metabolic Engineering of Poly(3-Hydroxyalkanoates): From DNA to Plastic," Microbiol Mol Biol R, 63(1):21-53 (1999).
Matsusaki et al., "Biosynthesis and Properties of Poly(3-hydroxybutyrate-co-3-hydroxyalkanoates) by Recombinant Strains of *Pseudomonas* sp. 61-3," Biomacromolecules, 1(1):17-22 (2000).
Notification Concerning Transmittal of International Preliminary Report on Patentability for International Application No. PCT/US2010/040056, dated Jan. 12, 2012.
Notification Concerning Transmittal of International Preliminary Report on Patentability, International Application No. PCT/US2010/040037, dated Jan. 12, 2012.
Notification Concerning Transmittal of International Preliminary Report on Patentability, PCT/US2013/044339, "Biobased Rubber Modified BioDegradable Polymer Blends," dated Dec. 18, 2014.
Notification Concerning Transmittal of International Preliminary Report on Patentability, PCT/US2013/044367, "Low Glass Transition Polyhydroxyalkanoates for Modification of Biodegradable Polymers," dated Dec. 18, 2014.
Notification Concerning Transmittal of International Search Report, International Application No. PCT/US2013/044367, International Filing Date Jun. 5, 2013, entitled "Low Glass Transition Polyhydroxyalkanoates for Modification of Biodegradable Polymers", Date of Communication: Aug. 5, 2013.
Office Communication, U.S. Appl. No. 13/698,229, entitled "Toughening Polylactic Acid With Polyhydroxyalkanoates", Date of Communication: Mar. 27, 2015.
Park et al., "Production of Poly(3-hydroxybutyrate-co-3-hydroxyhexanoate) by Metabolically Engineered *Escherichia coli* Strains," Biomacromolecules, 2(1):248-254 (2001).
Patent Examination Report No. 1, Australian Patent Application No. 2010265939; dated Sep. 27, 2012.
Poirier, "Polyhydroxyalknoate synthesis in plants as a tool for biotechnology and basic studies of lipid metabolism," Prog Lipid Res, 41(2):131-155 (2002).
Saravanan D, et al., "Synthesis and characterization of cross linked chitin/bentonite polymer blend and absorption studies of Cu (II) and Cr (VI) on chitin," Scholars Research Library Der Pharma Chemica, 3(6): 406-424 (2011).
Steinbuchel et al., "Diversity of bacterial polyhydroxyalkanoic acids," FEMS Microbiol Lett, 128(3):219-228 (1995).
Wiebking, "Increasing the Flexural Modulus of Rigid PVC at Elevated Temperatures," J Vinyl Addit Techn, 12: 37-40 (2006).
Williams et al.,"Biodegradable plastics from plants," Chemtech, 26:38-44 (1996).
Written Opinion for International Application No. PCT/US10/040037 dated Feb. 1, 2011.
Written Opinion for International Application No. PCT/US13/044339 dated Aug. 1, 2013.
Written Opinion for International Application No. PCT/US2011/036808 dated Jan. 18, 2012.
Written Opinion of the International Searching Authority for International Application No. PCT/US2010/040056, dated Feb. 1, 2012.
Office Action from co-pending Chinese Application No. 201680079049.8. dated Feb. 27, 2020.

* cited by examiner

US 11,091,632 B2

POLYMER BLENDS WITH CONTROLLABLE BIODEGRADATION RATES

RELATED APPLICATION

This application is the U.S. National Stage of International Application No. PCT/US2016/062507, filed Nov. 17, 2016, which designates the U.S., published in English, and claims the benefit of U.S. Provisional Application No. 62/256,265, filed on Nov. 17, 2015. The entire teachings of the above applications are incorporated herein by reference.

BACKGROUND OF THE INVENTION

Polyhydroxyalkanoates (PHA's) are unique materials to use as components in biodegradable consumer products because they quickly biodegrade in many types of environments (water, soil, sludge and composts). Further advantages to utilizing PHA's in products are that they can be manufactured as 100% biobased polymers from renewable starting materials and they are easily combined with other plastic materials in order to tailor product properties. Genetically-modified biomass systems have recently been developed which produce a wide variety of biodegradable PHA homopolymers and copolymers with material properties ranging from very hard and brittle to rubber-like elasticity (Lee (1996), Biotechnology & Bioengineering 49:1-14; Braunegg et al. (1998), J. Biotechnology 65:127-161; Madison, L. L. and Huisman, G. W. (1999), Metabolic Engineering of Poly-3-Hydroxyalkanoates; From DNA to Plastic, in: Microbiol. Mol. Biol. Rev. 63:21-53). Highly elastic or rubbery PHA's have been shown to be effective toughening agents for biodegradable plastics such as polylactic acid (International Pub. No. WO 2011/146484). It will be shown that rubbery PHA copolymers can also be used to modulate the biodegradation rates of other biodegradable plastics when utilized as a polymer blend additive or as a layer in a multilayer film laminate.

SUMMARY OF THE INVENTION

Described herein are biodegradable polymer blend compositions comprising biobased copolymers of 3-hydroxybutyrate wherein one or more comonomers selected from 4-hydroxybutyrate, 5-hydroxyvalerate, 3-hydroxyhexanoate or 3-hydroxyoctanoate are incorporated into the copolymer. These blend compositions have improved properties such as faster rates of biodegradation.

In a first aspect, the invention pertains to biodegradable compositions comprising a polymer blend of a polybutylene succinate (PBS) and a biobased PHA copolymer of 3-hydroxybutyrate wherein one or more comonomers selected from 4-hydroxybutyrate, 5-hydroxyvalerate, 3-hydroxyhexanoate or 3-hydroxyoctanoate, are incorporated at 25 weight % to about 85 weight % of the copolymer, has a glass transition temperature of about −15° C. to about −50° C., in an amount sufficient to increase the biodegradation rate of the composition by a factor of at least two, wherein the renewable carbon content of the PHA is at least 90% by weight according to ASTM D6866.

In a second aspect, a biodegradable composition comprising a polymer blend of polybutylene-succinate-adipate (PBSA) and a biobased copolymer of 3-hydroxybutyrate wherein one or more comonomers selected from the group 4-hydroxybutyrate, 5-hydroxyvalerate, 3-hyroxyhexanoate or 3-hydroxyoctanoate, are incorporated at 25 weight % to about 85 weight % of the copolymer and has a glass transition temperature of about −15° C. to about −50° C., in an amount sufficient to increase the biodegradation rate of the composition by a factor of at least two, wherein the renewable carbon content of the PHA is at least 90% by weight according to ASTM D6866.

In certain embodiments, the compositions include a plasticizer or other additives.

In certain embodiments of the first aspect, the 3-hydroxybutyrate copolymer has one or more of the comonomers 4-hydroxybutyrate, 5-hydroxyvalerate, 3-hyroxyhexanoate or 3-hydroxyoctanoate incorporated into the copolymer composition at about 25 weight % to about 85 weight %, about 30 weight % to about 80 weight % of the copolymer composition, about 40% to about 75% in the copolymer composition, about 40% to about 65% in the copolymer composition, about 40% to about 50% in the copolymer composition, about 45% to about 50% in the copolymer composition.

In a second embodiment of the first aspect of the invention, the biobased copolymer of 3-hydroxybutyrate comprising one or more comonomers selected from the group 4-hydroxybutyrate, 5-hydroxyvalerate, 3-hydroxyhexanoate and 3-hydroxyoctanoate has a molecular weight of about 500,000 to about 1,500,000 g/mole (Daltons) or about 550,000 to about 750,000 g/mole (Daltons).

In a third embodiment, including other embodiments and aspects of the invention, the weight percent of the 3-hydroxybutyrate copolymer in the blend is between 1-40% by weight, about 3-35% by weight of the composition, about 15% to about 25% by weight of the total composition, or about 30% to about 40% by weight of the total composition.

In a third aspect of the invention, the compositions of the invention have a renewable carbon content of the biodegradable blend as measured by ASTM D6866 is a least 1% by weight of the composition, at least 10% by weight of the composition, at least 20% by weight of the composition, at least 40% by weight of the composition, at least 50% by weight of the composition, at least 60% by weight of the composition, at least 70% by weight of the composition, at least 80% by weight of the composition, at least 85% by weight of the composition, at least 90% by weight of the composition, at least 95% by weight of the composition, at least 97% by weight of the composition, at least 98% by weight of the composition, at least 99% by weight of the composition or at least 100% by weight of the composition.

In another embodiment of the invention, the renewable carbon content of the 3-hydroxybutyrate copolymer as measured by ASTM D6866 is at least 85%, at least 90%, at least 95%, at least, 96%, at least, 97%, at least 98%, at least 99%, at least 100% by weight of the copolymer.

In a fourth aspect of the invention, the composition further comprises two or more of the following: PBS, PBSA, polybutylene-adipate-terephthalate (PBAT) or polyhydroxyalkanoates such as poly-3-hydroxybutyrate-co-4-hydroxybutyrate (P3HB-4HB), poly-3-hydroxybutyrate-co-5-hydroxyvalerate (P3HB-5HV), poly-3-hydroxybutyrate-co-3-hydroxyhexanoate (P3HB-3HH), poly-3-hydroxybutyrate-co-3-hydroxyoctanoate (P3HB-3HO).

In any of the embodiments and aspects of the invention, the composition further comprise a filler selected from one or more of the following carbon black, cyanuric acid, uracil, thymine, mica, talc, silica, boron nitride, barium nitride, nanoclay, calcium carbonate, synthesized silicic acid and salts, metal salts of organophosphates, and kaolin or combination thereof.

In a fifth aspect of the invention, the 3-hydroxybutyrate copolymer comprises an amorphous rubber phase having no melting point.

In a sixth aspect of the invention, the composition further comprises one or more additives, for example, one or more selected from plasticizers, clarifiers, nucleating agents, thermal or oxidative stabilizers, anti-slip agents, compatibilizers (e.g., maleic anhydride), anti-blocking agents or a combination thereof.

The compositions of the invention can be a film or multilayer laminate comprising at least one film layer comprising the composition of the invention, for example a film having a thickness of about 1 to about 2 microns.

Articles made with the laminate and articles such as foam, woven and non-woven fibers, a thermoformed part or injection molded part of the invention are also contemplated.

Also included is a biobased copolymer of 3-hydroxybutyrate comprising one or more comonomers selected from the group 4-hydroxybutyrate, 5-hydroxyvalerate, 3-hydroxyhexanoate and 3-hydroxyoctanoate prepared by culturing a recombinant host with a renewable feedstock to produce a biobased 3-hydroxybutyrate copolymer biomass for use in the compositions of the invention described above. The source of the renewable feedstock is selected from glucose, fructose, sucrose, arabinose, maltose, lactose, xylose, glycerol, ethanol, methanol, fatty acids, vegetable oils, and biomass derived synthesis gas or a combination thereof. The renewable carbon content of the biobased poly-3-hydroxybutyrate-co-4-hydroxybutyrate copolymer is easily determined using the method described in ASTM D6866.

The blends of the invention having a total % 4HB, %5HV, %3HH and %3HO content of at least 25-50% by weight have unexpected properties, for example, films made from the compositions described here in have desirable properties for commercial products, for example, the formulations have sufficient tear strength and toughness, faster biodegradation rates as compared to the pure non-PHA polymer and are capable of being processed on a blown film line or thermoformed into articles for repairing marine habitats such as coral reefs, oyster beds, clam beds and the like.

In other embodiments, the blend compositions are biodegradable in marine environments, soil, sludge and compost.

One or more additives may also be included in the compositions of any of the aspects of the invention and methods of the inventions. The types of additives include but are not limited to plasticizers, clarifiers, nucleating agents, thermal stabilizers, inorganic fillers, anti-slip agents, and anti-blocking agents. Although sometimes not needed in the blend, compatibilizers can also be added. In particular embodiments of the first and second aspect of the invention, a nucleating agent is added. In other embodiments of the first and second aspects of the invention, a nucleating agent and a compatibilizer are added, in certain of these embodiments, the nucleating agent is cyanuric acid or boron nitride and the compatibilizer is maleic anhydride.

In still another embodiment, a method of making a biodegradable article comprising a 3-hydroxybutyrate copolymer wherein one or more comonomers are selected from 4-hydroxybutyrate, 5-hydroxyvalerate, 3-hydroxyhexanoate and 3-hydroxyoctanoate and poly-butylene-succinate or poly-butylene-succinate-adipate, comprising the steps of: melt-blending the 3-hydroxybutyrate copolymer and PBS or PBSA under conditions that cause melting and mixing of the blend, thereby forming a molten polymer composition; and forming an article from the molten polymer composition; thereby making an article comprising a tough, tear resistant biodegradable, polymer composition of 3-hydroxybutyrate copolymer and PBS or PBSA. Articles, films and laminates comprising the compositions of the invention are also described.

DETAILED DESCRIPTION

In various aspects, the present invention is a biodegradable polymer composition, comprising a blend of a succinate copolymer selected from polybutylene-succinate and polybutylene-succinate-adipate; and a 3-hydroxybutyrate (3HB) copolymer, wherein the 3HB copolymer contains at least one other monomer selected from the group consisting of 4-hydroxybutyrate, 5-hydroxyvalerate, 3-hydroxyhexanoate and 3-hydroxy-octanoate, wherein the 3HB copolymer has at least 90% renewable carbon content as measured by ASTM D6866, and further wherein: the content of the 3HB copolymer in the polymer composition is from about 1% to about 40% by weight of the composition, and the biodegradation rate of the polymer composition is at least two times faster than the biodegradation rate of a reference composition containing no 3HB copolymer.

In example embodiments, the 3HB copolymer is poly-3-hydroxybutyrate-co-4-hydroxybutyrate. For example, the content of 4-hydroxybutyrate in the 3HB copolymer is about 35% to about 65% by weight of the 3HB copolymer, about 45% to about 55% by weight of the 3HB copolymer, or about 50% to about 60% by weight of the 3HB copolymer.

In certain example embodiments, the 3-hydroxybutyrate copolymer has a molecular weight of about 500,000 to about 1,500,000 daltons as measured by gel permeation chromatography, and a glass transition temperature as measured by differential scanning calorimetry of −5 to −50° C. In other example embodiments, the 3-hydroxybutyrate copolymer has a molecular weight of about 550,000 to about 750,000 daltons as measured by gel permeation chromatography, and a glass transition temperature as measured by differential scanning calorimetry of −10 to −30° C.

In example embodiments, the 3HB copolymer is poly-3-hydroxybutyrate-co-4-hydroxybutyrate, and the content of 3HB copolymer in the composition is about 5-95% by weight of the composition.

In example embodiments, the renewable carbon content of the polymer composition of the invention as measured by ASTM D6866 is at least 1% by weight of the composition, at least 20% by weight of the composition, at least 40% by weight of the composition, at least 80% by weight of the composition, at least 95% by weight of the composition, at least 99% by weight of the composition, or is 100% by weight of the composition.

In example embodiments, the renewable carbon content of the 3HB copolymer is at least 95% by weight of the copolymer, at least 97% by weight of the copolymer, at least 98% by weight of the copolymer, at least 99% by weight of the copolymer, or at least 100% by weight of the copolymer.

In various example embodiments of the polymer composition defined herein, the 3HB copolymer is a poly-3-hydroxybutyrate-co-4-hydroxybutyrate having the content of 4-hydroxybutyrate (4HB) from 30% to 50% by weight of the copolymer.

In example embodiments, the biodegradation rate of the polymer composition defined herein is at least 3, at least 5, at least 10, or at least 20 times faster than the biodegradation rate of a reference composition containing no 3HB copolymer.

In certain example embodiments, the polymer composition further comprises a third biodegradable polymer. In other example embodiments, the polymer composition defined herein can further comprise a nucleating agent selected from one or more of the following carbon black, cyanuric acid, uracil, thymine, mica talc, silica, boron nitride, barium nitride, clay, calcium carbonate, synthesized silicic acid and salts, metal salts of organophosphates, and kaolin.

In example embodiments, the 3HB copolymer is poly-3-hydroxybutyrate-co-4-hydroxybutyrate, and wherein the content of 4-hydroxybutyrate in the 3HB copolymer is about 30% to about 65% by weight of the 3HB copolymer, about 30% to about 50% by weight of the 3HB copolymer, about 30% to about 45% by weight of the 3HB copolymer, about 30% to about 40% by weight of the 3HB copolymer, about 45% to about 65% by weight of the 3HB copolymer.

In example embodiments, the 3HB copolymer is poly-3-hydroxybutyrate-co-4-hydroxybutyrate, and wherein the 3HB copolymer comprises an amorphous rubber phase having no melting point.

In example embodiments of the polymer composition defined herein, the 3HB copolymer is poly-3-hydroxybutyrate-co-4-hydroxybutyrate, and wherein the content of the 3HB copolymer in the composition is about 5% to about 50% by weight of the composition, or about 10% to about 40% by weight of the composition.

In some example embodiments, the polymer composition defined herein further comprising one or more additives. In various example embodiments, the additive is selected from one or more of a plasticizer, a clarifier, a nucleating agent, a thermal or oxidative stabilizer, an inorganic filler, an anti-slip agent, a compatibilizer, a blocking agent, a pigment.

In certain example embodiments, the 3HB copolymer is prepared by culturing a recombinant host with a renewable feedstock to produce a biobased poly-3-hydroxybutyrate-co-4-hydroxybutyrate biomass. The source of the renewable feedstock can be selected from glucose, fructose, sucrose, arabinose, maltose, lactose, xylose, glycerol, ethanol, methanol, fatty acids, vegetable oils, and biomass derived synthesis gas or a combination thereof.

In various aspects, the present invention is a film or multilayer laminate comprising at least one film, said film comprising any of the example embodiment of the polymer composition defined herein. For example, the present invention can be a multilayer laminate that includes a film of any polymer composition defined herein that has a thickness of about 1 to about 2 microns.

In other aspect, the present invention is a method of preparing polymer composition, the method comprising melt-blending a blend, the blend comprising: a succinate copolymer selected from polybutylene-succinate and polybutylene-succinate-adipate; and a 3-hydroxybutyrate (3HB) copolymer, wherein the 3HB copolymer contains at least one other monomer selected from the group consisting of 4-hydroxybutyrate, 5-hydroxyvalerate, 3-hydroxyhexanoate and 3-hydroxy-octanoate, wherein the 3HB copolymer has at least 90% renewable carbon content as measured by ASTM D6866, and further wherein the content of the 3HB copolymer in the polymer composition is from about 1% to about 40% by weight of the composition, and the biodegradation rate of the polymer composition is at least two times faster than the biodegradation rate of a reference composition containing no 3HB copolymer.

In other aspects, the present invention is an article comprising the polymer composition defined herein. The article of the present invention can further comprise a foam, woven fibers, nonwoven fibers, a thermoformed part, or an injection molded part.

Described herein are biodegradable polymer blend compositions of polybutylene-succinate (PBS) or polybutylene-succinate-adipate (PBSA) and a biobased copolymer of 3-hydroxybutyrate (3HB) incorporating one or more comonomers selected from 4-hydroxybutyrate (4HB), 5-hydroxyvalerate (5HV), 3-hydroxyhexanoate (3HH) and 3-hydroxyoctanoate (3HO) with the blend having a renewable carbon content of at least 1% by weight with improved properties such as tensile toughness, tear strength and faster biodegradation rates as compared to PBS or PBSA polymers that do not contain biobased 3-hydroxybutyrate copolymers.

In a first aspect, the invention pertains to biodegradable compositions comprising a blend of the polymer polybutylene-succinate and a biobased 3-hydroxybutyrate copolymer comprising one or more monomers selected from 4-hydroxybutyrate, 5-hydroxyvalerate, 3-hydroxyhexanoate and 3-hydroxyoctanoate which are incorporated into the copolymer at about 25% to about 85% weight percent, impart to the copolymer a glass transition temperature of about −15° C. to about −50° C., have a weight average molecular weight as measured by gel permeation chromatography (GPC) of at least 500,000 g/mole and provide a renewable carbon content of the biodegradable blend of at least 5% by weight of the composition. The blend has a percent by weight 3-hydroxybutyrate copolymer of 1-40%.

In a second aspect, the invention pertains to biodegradable compositions comprising a blend of the polymer polybutylene-succinate-adipate and a biobased 3-hydroxybutyrate copolymer comprising one or more monomers selected from 4-hydroxybutyrate, 5-hydroxyvalerate, 3-hydroxyhexanoate and 3-hydroxyoctanoate which are incorporated into the copolymer at about 25% to about 85% weight percent, impart to the copolymer a glass transition temperature of about −15° C. to about −50° C., have a weight average molecular weight as measured by gel permeation chromatography (GPC) of at least 500,000 g/mole and provide a renewable carbon content of the biodegradable blend of at least 1% by weight of the composition. The blend has a percent by weight 3-hydroxybutyrate copolymer of 1-40%.

In particular, when these components are melt-blended, the resultant compositions display many unexpected synergies for the blend for example in the biodegradation rate, processing and mechanical properties, such as thermoformed processing and thermoformed properties.

Pure poly-4-hydroxybutyrate (P4HB) homopolymer is a mostly amorphous, rubbery polymer at room temperature with a significantly lower glass transition temperature ($T_g$=−60° C.) than that of many pure polymers. When 3-hydroxbutyrate is combined with 4-hydroxybutyrate in a copolymer, where the %4HB>25% by weight, the copolymer retains its rubbery properties ($T_g$=−15° C. to −50° C.). Similar rubbery behavior is observed when 3-hydroxybutyrate is combined with other comonomers such 5-hydroxyvalerate, 3-hydroxhexanoate or 3-hydroxyoctanoate. When the rubbery PHA copolymer is blended with other polymers, it readily forms a separate rubber phase which imparts a toughening effect on the overall polymer blend. Because of this property and its proven biodegradability in various environments, it is a beneficial material for improving not only the toughness properties but also enhancing the overall biodegradability of the blend.

The invention provides PBS or PBSA/3-hydroxybutyrate copolymer compositions and methods of preparing the blends having improved tensile toughness and elongation as well as tear, impact strength and faster biodegradation rates as compared to the pure PBS or PBSA polymers.

The temperatures experienced by a polymer during processing can cause a drop in melt strength due to thermal degradation, which can in turn cause difficulties in processing the polymer(s). Increased melt strength is therefore useful in that it allows the polymers to be processed across a broader temperature range. A broader "processing window" is especially important in certain polymer applications, such as in the production of blown film (i.e., in preventing or reducing bubble collapse), or cast film extrusion, thermoformed articles (i.e., preventing or reducing sheet sag during thermoforming), profile extruded articles (i.e., preventing or reducing sag), non-woven fibers, monofilament, etc. Additionally, articles made from the compositions described herein exhibit greater tensile toughness and elongation while exhibiting an increased biodegradability. The increased toughness and elongation are due to the high molecular weight of 3-hydroxybutyrate copolymer while the increases in biodegradability are due to the chemical composition of the copolymer. The increases in tensile toughness can be 10 to 40 fold greater. The increases in elongation can be 10 to 60 fold greater. Tensile toughness increase can be 10-20, 20-30 or 25-35 fold. Elongation increase can be 20-30, 30-40 or 45-60 fold. Increases in biodegradation rate can be 2 fold, 3 fold, 4 fold or 10 fold. The material properties of the blend required for processing as well as the desired biodegradability rate can therefore be designed into the blend by varying the composition of the 3-hydroxybutyrate copolymer and the copolymer's overall concentration in the blend.

The films produced by the compositions described herein can also be used to make laminates. The biodegradable laminates comprising the compositions of the invention are suitable for coating other layers such as paper to produce articles or containers. The laminate is produced for example by co-extruding a composition of the invention onto a paper layer or with another thermoplastic blend or composition. Other layers of thermoplastic polymers or additional layers of a composition of the invention can also be included or stacked to form laminates. For example, adhesive layers can also be added or other polymer layers that impart particular desired properties. For example, the blended materials or laminates can be different and improved by varying compositions to change the degree of hardness, softness, flexibility, tackiness, toughness, ductility, processability, opaqueness and the like. Additives, such as anti-blocking agents, plasticizers and the like are also contemplated.

In certain aspects, the laminate can be 1 to 15 layers, for example 2 layers, 3 layers, 4 layers or 5 layers, 6 layers, 7 layers, 8 layers, 10 layers, 11 layers, 12 layers, 13 layers, 14 layers or 15 layers. The overall size of the laminate is about 10 microns to about 100 microns, for example 10-50 microns, 20-60 microns, 25-75 microns. Each individual layer can be about 1 to about 2 microns, for example about 1 to about 5 micron, about 2 to about 4 microns, about 2 to about 5 microns. For each laminate, at least one layer is a composition of the invention, for example, the composition of the first, second, third or fourth aspect of the invention. In certain embodiments, the compositions of the invention comprise more than one layer, for example two, three, four or more.

Thermoformed articles can also be made from the compositions described herein. Thermoforming is a production process that heats a two dimensional thermoplastic sheet to its softening point and then uses vacuum and/or pressure to mold and stretch the sheet into a three dimensional finished shape. Thermoforming is essentially a single-sided process in that only one side of the sheet can be controlled by the molding tool surface. The tooling costs for this type of processing are usually lower than injection molding with product development cycles being faster as well. Plastics parts produced via a thermoforming process can be used for automotive parts and intricate medical devices.

Injection molded articles can additionally be made from the blend compositions described herein. Polymers used for injection molded parts are first fed into a heated barrel and melted. Then they are mixed and finally forced into a closed mold cavity under pressure to create the part. The part is cooled and so hardens to the configuration of the cavity. After cooling, the mold is opened and the part is then ejected and sometimes subjected to further finishing steps. The number of parts that can be made in a short period time with injection molding is high however the costs associated with making the part mold are also high. Parts to be injection molded must be very carefully designed to facilitate the molding process; the polymer used for the part, the desired shape and features of the part, the material of the mold, and the properties of the injection molding machine must all be taken into account. Injection molding is widely used for manufacturing a variety of parts, from the smallest components to entire body panels of cars.

As used herein, biobased content, also known as the renewable carbon or modern carbon content, is defined as the weight percentage of $^{14}C$ carbon (radiocarbon) present in the polymer as measured by deriving a ratio of the amount of radiocarbon in an unknown sample to that of a modern reference standard. The ratio is reported as a percentage with the units "pMC" (percent modern carbon). If the material being analyzed is a mixture of present day radiocarbon and fossil carbon (i.e., containing no radiocarbon), then the pMC value obtained correlates directly to the amount of biomass material present in the sample. The weight percent $^{14}C$ carbon present in a material is generally measured using accelerated mass spectroscopy as outlined in ASTM D6866.

As used herein, amorphous refers to the state of the 3-hydroxybutyrate copolymer which is not crystalline, for example, no lattice structure or long range molecular order characteristic of a crystalline state. The degree of crystallinity for the invention described herein is the fraction of the polymer that exists in an orderly state, having a lattice structure. In certain embodiments, one phase of the multiphase 3-hydroxybutyrate copolymer is between about 0 to about 5% crystallinity, for example the degree of crystallinity in percent is about 0, or is minimally observed to be less than about 1%. In a preferred embodiment, the degree of crystallinity of one phase of the multiphase 3-hydroxybutyrate copolymer polymer is below 3%, for example, below 2% or below 1% or ranges or numbers calculated between these percentages such as 2.5%. The degree of crystallinity calculated for the compositions of the invention is minimal and can be determined by various methods, for example, density calculations, x-ray and electron diffraction, differential scanning calorimetry, infrared absorption (FTIR), Raman spectroscopy and the like.

$T_g$ is the glass transition temperature or the glass-rubber transition temperature. It is defined as the temperature where the polymer chains begin coordinated molecular motions. Physically, the polymer modulus begins to drop several orders of magnitude until the polymer finally reaches a rubbery state.

Physical properties and rheological properties of polymeric materials depend on the molecular weight and distribution of the polymer. "Molecular weight" is calculated in a number of different ways. Unless otherwise indicated, "molecular weight" refers to weight average molecular weight.

"Number average molecular weight" ($M_n$) represents the arithmetic mean of the distribution, and is the sum of the products of the molecular weights of each fraction, multiplied by its mole fraction ($\Sigma N_i M_i / \Sigma N_i$).

"Weight average molecular weight" ($M_w$) is the sum of the products of the molecular weight of each fraction, multiplied by its weight fraction ($\Sigma N_i M_i^2 / \Sigma N_i M_i$). $M_w$ is generally greater than or equal to $M_n$.

The weight average molecular weight of the 3-hydroxybutyrate copolymer used in the compositions of the invention ranges between about 600,000 to about 2,000,000 Daltons as measured by light scattering and GPC with polystyrene standards. In particular embodiments the molecular weight is about 500,000 to 750,000 or about 700,000 to about 1,500,000 Daltons.

The invention provides biodegradable, PBS or PBSA/3-hydroxybutyrate copolymer blend compositions that do not require the use of a compatibilizer for mixing but have improved properties and higher biodegradation rates as compared to PBS and PBSA without 3-hydroxybutyrate copolymer.

Poly-Butylene-Succinate (PBS) and Poly-Buytlene-Succinate-Adipate (PBSA)

Polybutylene succinate (PBS) and polybutylene-succinate-adipate (PBSA) are synthetic, largely petroleum-based but can be biobased aliphatic polyesters, made by condensation polymerization followed by chain extension using multi-functional isocyanates. PBS is a combination of 1,4-butane diol and succinic acid, while PBSA is a combination of 1,4-butanediol, succinic acid, and adipic acid. Although usually synthesized from petroleum, it is also possible for the monomers that make up PBS and PBSA to be produced from biobased feedstock.

PBS and PBSA are commercially available for example from, Showa HighPolymer, Japan; SkyGreen BDP, Korea; and SK Polymer, Ire Chemicals Co., Korea; and Sqehan Co, Korea; among others.

The two polymers are reportedly biodegradable at ambient temperatures (i.e., are "cold compostable") in soil and marine conditions. Overall, PBS tends to degrade more slowly as compared to PBSA. PBS is hydro-biodegradable and begins to biodegrade via a hydrolysis mechanism. Hydrolysis occurs at the ester linkages and this results in a lowering of the polymer's molecular weight, allowing for further degradation by micro-organisms.

Of the two, PBS has the higher crystallinity, and is therefore better suited for thermoforming and molding applications, while PBSA has a lower crystallinity and is better suited to film applications. Both polymers have a low (sub-zero) glass transition temperature and their melt processing temperatures overlap with those of PHAs. Therefore PHA polymers can be readily combined with PBS and/or PBSA using conventional processing techniques. As described in the invention, when 3-hydroxybutyrate copolymers are added to PBS or PBSA at 1-40% by weight of the composition, the biodegradation rate of the blend composition increases and can be therefore be modulated depending on the weight percent 3-hydroxybutyrate copolymer that is added. In this way, the 3-hydroxybutyrate copolymer can be used to tailor the biodegradation rate of the PBS or PBSA to suit a particular application.

Polyhydroxyalkanoates (PHAs)

Polyhydroxyalkanoates (PHAs) are biological polyesters synthesized by a broad range of natural and genetically engineered bacteria as well as genetically engineered plant crops (Braunegg et al., (1998), *J. Biotechnology* 65:127-161; Madison and Huisman, 1999, *Microbiology and Molecular Biology Reviews*, 63:21-53; Poirier, 2002, *Progress in Lipid Research* 41:131-155). These polymers are biodegradable thermoplastic materials, produced from renewable resources, with the potential for use in a broad range of industrial applications (Williams & Peoples, *CHEMTECH* 26:38-44 (1996)).

Useful microbial strains for producing PHAs, include *Alcaligenes eutrophus* (renamed as *Ralstonia eutropha*), *Alcaligenes latus*, *Azotobacter*, *Aeromonas*, *Comamonas*, *Pseudomonads*, and genetically engineered organisms including genetically engineered microbes such as *Pseudomonas*, *Ralstonia* and *Escherichia coli*.

In general, a PHA is formed by enzymatic polymerization of one or more monomer units inside a living cell. Over 100 different types of monomers have been incorporated into the PHA polymers (Steinbüchel and Valentin, 1995, *FEMS Microbiol. Lett.* 128:219-228. Examples of monomer units incorporated in PHAs for this invention include 2-hydroxybutyrate, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HH), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center. For compositions included herein, the PHA composition does not include poly(lactic acid).

In certain embodiments, the starting PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

By selecting the monomer types and controlling the ratios of the monomer units in a given PHA copolymer, a wide range of material properties can be achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

The 3-hydroxybutyrate copolymers (P3HB3HP, P3HB4HB, P3HB3HV, P3HB4HV, P3HB5HV, P3HB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature ($T_g$) in the range of 6° C. to −10° C., and a melting temperature $T_m$ of between 80° C. to 180° C. as measured by differential scanning calorimetry (DSC). Type 2 PHB copolymers typically have a Tg of −20° C. to −50° C. and Tm of 55° C. to 90° C.

Preferred Type 2 PHB copolymers have two monomer units and have a majority of their monomer units being 3-hydroxybutyrate monomer by weight in the copolymer, for example, greater than or equal to 45% 3-hydroxybutyrate monomer. Type 2 PHB copolymers have a 3HB content of between 95% and 55% by weight of the copolymer, for example 95%, 90%, 85%, 80%, 75%, 70%, 65%, 60%, 55%, 50% and 45% by weight of the copolymer. Preferred PHB copolymers for this invention are biologically produced from renewable resources and are selected from the following group of PHB copolymers:

PHB4HB is a Type 2 PHB copolymer where the 4HB content is in the range of 20% to 70% by weight of the copolymer and preferably in the range of 25% to 65% by weight of the copolymer for example: 25% 4HB; 30% 4HB; 35% 4HB; 40% 4HB; 45% 4HB; 50% 4HB; 55% 4HB; 60% 4HB; 65% 4HB by weight of the copolymer.

PHB5HV is a Type 2 PHB copolymer where the 5HV content is in the range of 20% to 70% by weight of the copolymer and preferably in the range of 25% to 65% by weight of the copolymer for example: 25% 5HV; 30% 5HV; 35% 5HV; 40% 5HV; 45% 5HV; 50% 5HV; 55% 5HV; 60% 5HV; 65% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40% 3HH; 45% 3HH; 50% 3HH; 55% 3HH, 60% 3HH; 65% 3HH; 70% 3HH; 75% 3HH; 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 45% 3HX; 50% 3HX; 55% 3HX 60% 3HX; 65% 3HX; 70% 3HX; 75% 3HX; 80% 3HX; 85% 3HX; 90% 3HX by weight of the copolymer.

PHAs for use in the methods, compositions and pellets described in this invention are selected preferably from Type 2 PHB4HB copolymers having a %4HB content of 40-65%.

Microbial systems for producing the PHB copolymer PHBV are disclosed in, e.g., U.S. Pat. No. 4,477,654 to Holmes, which is incorporated herein by reference in its entirety. U.S. Published Application No. US 2002/0164729 by Skraly and Sholl and International Pub. No. WO 2014/058655 by Ramseier et. al. describe useful systems for producing the PHB copolymer PHB4HB and are incorporated herein by reference in their entirety.

Useful processes for producing the PHB copolymer PHB3HH have been described (Lee et al., 2000, *Biotechnology and Bioengineering* 67:240-244; Park et al., 2001, *Biomacromolecules* 2:248-254). Processes for producing the PHB copolymers PHB3HX have been described by Matsusaki et al. (*Biomacromolecules* 2000, 1:17-22).

In determining the molecular weight techniques such as gel permeation chromatography (GPC) can be used. In the methodology, a polystyrene standard is utilized. The PHA can have a polystyrene equivalent weight average molecular weight (in daltons) of at least 500, at least 10,000, or at least 50,000 and/or less than 2,000,000, less than 1,500,000, less than 1,000,000, and less than 800,000. In certain embodiments, preferably, the PHAs generally have a weight-average molecular weight in the range of 100,000 to 900,000. For example, the molecular weight range for Type 2 PHB copolymers for use in the application is 100,000 to 1.5 million daltons.

In certain embodiments, the PHA can have a linear equivalent weight average molecular weight of from about 150,000 daltons to about 500,000 daltons and a polydispersity index of from about 2.5 to about 8.0. As used herein, weight average molecular weight and linear equivalent weight average molecular weight are determined by gel permeation chromatography, using, e.g., chloroform as both the eluent and diluent for the PHA samples. Calibration curves for determining molecular weights are generated using linear polystyrenes as molecular weight standards and a 'log MW vs elution volume calibration method.

Additives

In certain embodiments, the polymers for use in the methods and compositions are blended in the presence of additives (e.g., nucleating agent(s), compatibilizer(s), anti-slip additive(s) and the like to further improve the mechanical and thermal properties of the composition. Plasticizers are often used to change the glass transition temperature and modulus of the composition, but surfactants may also be used. Lubricants may also be used, e.g., in injection molding or thermoforming applications. Additives to promote growth of bacteria on the surface of the blend composition thereby increasing the overall biodegradation rate are also contemplated for the invention. Plasticizers, surfactants, lubricants and other additives may all therefore be included in the overall blend composition.

In other embodiments, the compositions and methods of the invention include one or more plasticizers. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limted to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to reaction products of diols selected from butane diol, ethylene glycol, propane 1,2-diol, propane 1,3-diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other. Addition of plasticizers in the blend formulation can increase the biodegradation rate of the composition even further.

In certain embodiments, the compositions and methods of the invention include one or more surfactants. Surfactants are generally used to de-dust, lubricate, reduce surface tension, and/or densify. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Non-ionic surfactants with HLB values ranging from about 2 to about 16 can be used, examples being TWEEN-20, TWEEN-65, Span-40 and Span 85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

One or more lubricants can also be added to the compositions and methods of the invention. Lubricants are normally used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants are warmed and melted before or during processing of the blend.

In film applications of the compositions and methods described herein, anti-block masterbatch is also added. A suitable example is a slip anti-block masterbatch mixture of erucamide (20% by weight) diatomaceous earth (15% by weight) nucleant masterbatch (3% by weight), pelleted into PHA (62% by weight). Others are known to those of ordinary skill in the field of polymer processing.

Nucleating Agents

If desired, an optional nucleating agent is added to the compositions of the invention to aid in its crystallization. In certain embodiments, the nucleating agent aids in the crystallization of the compositions. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1, 3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers; phosphoric or phosphorous acid and its metal salts, such as diphenyl phosphate, diphenyl phosphite, metal salts of bis(4-tert-butylphenyl) phosphate, and methylene bis-(2,4-tert-butylphenyl)phosphate; sorbitol derivatives such as bis(p-methylbenzylidene) sorbitol and bis(p-ethylbenzylidene) sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

In certain embodiments, the nucleating agent is selected from: cyanuric acid, carbon black, mica talc, silica, boron nitride, clay, calcium carbonate, synthesized silicic acid and salts, metal salts of organophosphates, and kaolin. In particular embodiments, the nucleating agent is cyanuric acid.

In various embodiments, where the nucleating agent is dispersed in a liquid carrier, the liquid carrier is a plasticizer, e.g., a citric compound or an adipic compound, e.g., acetyl-citrate tributyrate (CITROFLEX® A4, Vertellus, Inc., High Point, N.C.), or DBEEA (dibutoxyethoxyethyl adipate), a surfactant, e.g., Triton X-100, TWEEN-20, TWEEN-65, Span-40 or Span 85, a lubricant, a volatile liquid, e.g., chloroform, heptane, or pentane, a organic liquid or water.

In other embodiments, the nucleating agent is aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole.

In particular embodiments, the nucleating agent can include aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole. The nucleant can have a chemical formula selected from the group consisting of

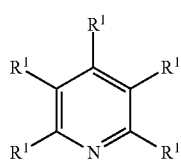

Formula 1

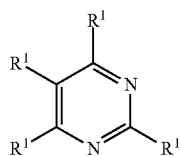

Formula 2

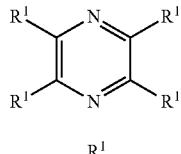

Formula 3

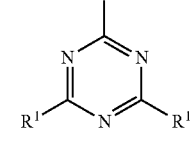

Formula 4

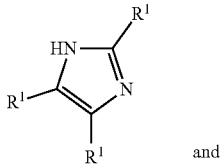

Formula 5 and

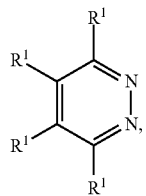

Formula 6 and combinations thereof, wherein each $R^1$ is independently H, $NR^2R^2$, $OR^2$, $SR^2$, $SOR^2$, $SO_2R^2$, CN, $CO_2R^2$, $CONR^2R^2$, $NO_2$, F, Cl, Br, or I; and each $R^2$ is independently H or $C_1$-$C_6$ alkyl.

The nucleating agent can be a nucleating agent as described in U.S. Published Application No. US 2005/0209377, by Allen Padwa, which is herein incorporated by reference in its entirety.

Another nucleating agent for use in the compositions and methods described herein are milled as described in International Publication No. WO 2009/129499, published in English on Oct. 22, 2009, and which designates the United States, which is herein incorporated by reference in its entirety. Briefly, the nucleating agent is milled in a liquid carrier until at least 5% of the cumulative solid volume of the nucleating agent exists as particles with a particle size of 5 microns or less. The liquid carrier allows the nucleating agent to be wet milled. In other embodiments, the nucleating agent is milled in liquid carrier until at least 10% of the cumulative solid volume, at least 20% of the cumulative solid volume, at least 30% or at least 40%-50% of the nucleating agent can exist as particles with a particle size of 5 microns or less, 2 microns or less or 1 micron or less. In alternative embodiments, the nucleating agents is milled by other methods, such as jet milling and the like. Additionally, other methods is utilized that reduce the particle size.

The cumulative solid volume of particles is the combined volume of the particles in dry form in the absence of any other substance. The cumulative solid volume of the particles is determined by determining the volume of the particles before dispersing them in a polymer or liquid carrier by, for example, pouring them dry into a graduated cylinder or other suitable device for measuring volume. Alternatively, cumulative solid volume is determined by light scattering.

Biodegradation of Plastics

Biodegradation is the breakdown and utilization of organic materials (compounds, polymers) by bacteria, fungi, or other biological organisms as nutrients for the cells. Although often used interchangeably, the term "biodegradable" is distinct in meaning from the term "compostable". While "biodegradable" simply means to be consumed by microorganism (mineralized) e.g. in soil, activated sludge or water environments, "compostable" makes the specific demand that the organic material break down under composting conditions i.e. usually at elevated temperatures. The term is often used in relation to ecology, waste management, biomedicine, and the natural environment (bioremediation) and is now commonly associated with environmentally friendly products that are capable of decomposing back into natural elements such as water and carbon dioxide. Organic material can be biodegraded aerobically in the presence of oxygen, or anaerobically, without the presence of oxygen thereby generating methane gas. Compounds such as enzymes (depolymerases, lipases) or biosurfactants are secreted by the microorganisms in order to initiate the biodegradation process.

Biodegradable matter is generally an organic material that serves as a nutrient for the microorganisms. Microorganisms are so numerous and diverse in the environment that a large range of organic compounds are capable of being biodegraded. This includes compounds such as hydrocarbons (e.g. oil), polychlorinated biphenyls (PCBs), polyaromatic hydrocarbons (PAHs), pharmaceutical substances and petroleum and biobased polymers (polyhydroxyalkanoates, polycaprolactone, PBS, polybutylene-adipate-terephthalate (PBAT), starch etc.). Total decomposition of biodegradable substances to water and carbon dioxide (known as mineralization) may include both biological and abiotic (temperature, sunlight, hydrolysis etc.) steps.

In practice, almost all organic chemical compounds and materials are subject to some degree of biodegradation. However the relative rates of such processes vary widely. A number of factors determine the degradation rate of polymer compounds. Important factors include the chemical composition, crystallinity, tacticity and molecular weight of the polymer as well as environmental conditions such as light, heat, moisture and oxygen (J. P. Eubeler et. al. (2010) *Trends in Analytical Chemistry*, vol. 29, No. 1, p 84-100). Temperature is important because chemical reactions proceed more quickly at higher temperatures. The degradation rate of many organic compounds may also limited by their bioavailability. Compounds must be released into solution before organisms can degrade them.

For polymers, the first step in the microbial biodegradation process is generally the adherence of the microorganisms to the surface of plastics followed by the colonization of the exposed surface. Biosurfactants play an important role during this step by excreting emulsifiers and other compounds which help to enhance microbial growth on hydrophobic, water-insoluble polymer surfaces. The colonized microbes then secrete polymer-degrading enzymes which mediate the random hydrolytic scission of the long chain polymer molecules. The enzymatic degradation of polymers by hydrolysis is essentially a two-step process: first, the enzyme binds to the polymer substrate then subsequently catalyzes a hydrolytic cleavage at the surface of the polymer. Polymer biodegradation therefore proceeds via surface dissolution, where the polymer is degraded into lower molecular weight oligomers, dimers and even monomers which can then be absorbed by the microorganism to be finally mineralized into water and carbon dioxide. The chemical composition of the polymer surface can greatly affect the rate at which these biodegradation steps occur and thereby influence the overall length of time for mineralization to occur (Green Plastics: An Introduction to the New Science of Biodegradable Plastics, E. S. Stevens, Princeton Univ. Press, 2002).

Biodegradability can be measured using a respirometry-type test. For biodegradation testing in soil, one places a polymer sample (a film or ground powder) into a container with aerobically active microorganisms, water and soil. The container is closed and then maintained at a standard temperature (20-35° C.). Over the course of several days or months, the microorganisms then digest the sample thereby using up the oxygen as well as producing carbon dioxide. Measurement of the rate of $CO_2$ generation over time allows the determination of the rate of biodegradation. For respirometry testing, the media can be soil, fresh water, salt water, compost or sludge. Anaerobic microbes can also be used. In this case, the amount of methane produced is measured and used to determine the biodegradation rate.

One can also measure biodegradation rate by gravimetric methods. In this case, a polymer film is buried in soil or other media containing active aerobic microorganisms and water. The weight loss of the polymer film over time is then measured and used to determine the disintegration rate.

Currently, several organizations certify the biodegradability of polymers under different standards and conditions. These include Vincotte, DIN-CERTCO and European Bioplastics. These are all European-based certifications for industrial composting, home composting, soil, fresh water and sea water biodegradation. The requirements standard utilized for composting, soil and water biodegradation is EN 13432 while the test method utilized is EN 14995. For sea water biodegradation, the requirement standard is ASTM D7081 and the test method is ASTM D6691. In the US, Biodegradable Products Institute (BPI) certifies for industrial composting using the standards ASTM D6400 (plastics) and D6868 (paper coatings). The Australian Bioplastics Association has also set up biodegradation certificates for home and industrial composting following the standards AS4736-2006 and AS5810-2010.

Application of the Compositions

For the fabrication of useful articles, the compositions described herein are processed preferably at a temperature above the crystalline melting point of the polymers but below the decomposition point of any of the ingredients (e.g., the additives described above, with the exception of some branching agents) of the polymeric composition. While in heat plasticized condition, the polymeric composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming. Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

The compositions described herein can be processed into films of varying thickness, for example, films of uniform thickness ranging from 1-200 microns, for example, 10-75 microns, 75 to 150 microns, or from 50-100 microns. Film layers can additionally be stacked to form multilayer films of the same or varying thicknesses or compositions of the same or varying compositions.

Blow molding, which is similar to thermoforming and is used to produce deep draw products such as bottles and similar products with deep interiors, also benefits from the increased elasticity and melt strength and reduced sag of the polymer compositions described herein.

The compositions described herein are provided in any suitable form convenient for an intended application. For example, the composition is provided in pellet for subsequent production of films, coatings, moldings or other articles, or the films, coatings, moldings and other articles.

The polymeric compositions of the present invention can be used to create, without limitation, a wide variety of useful products, e.g., automotive, consumer durable, consumer disposable, construction, electrical, medical, environmental and packaging products. For instance, the polymeric compositions can be used to make, without limitation, films (e.g., packaging films, agricultural film, mulch film, erosion control, salt or fresh water barriers, shellfish habitats, hay bale wrap, slit film, food wrap, pallet wrap, protective automobile and appliance wrap, etc.), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), packaging (including, but not limited to, packaging and containers for food and beverage products, cosmetic products, detergents and cleaning products, personal care products, pharmaceutical and wellness products), golf tees, caps and closures, agricultural supports and stakes, paper and board coatings (e.g., for cups, plates, boxes, etc.), thermoformed products (e.g., trays, containers, yoghurt pots, plant pots, noodle bowls, moldings, etc.), housings (e.g., for electronics items, e.g., cell phones, PDA cases, music player cases, computer cases, printers, calculators, LCD projectors, connectors, chip trays, circuit breakers, plugs, and the like), wire and cable products (including, but not limited to, wire, cable and coatings for wire and cable for vehicles, cars, trucks, airplanes, aerospace, construction, military, telecommunication, utility power, alternative energy, and electronics), industrial products (such as, but not limited to, containers, bottles, drums, materials handling, gears, bearings, gaskets and seals, valves, wind turbines, and safety equipment), products for transportation (such as, but not limited to, automotive aftermarket parts, bumpers, window seals, instrument panels, consoles, under hood electrical parts, and engine covers), appliances and appliance parts (such as, but not limited to, refrigerators, freezers, washers, dryers, toasters, blenders, vacuum cleaners, coffee makers, and mixers), articles for use in building and construction (such as, but not limited to, fences, decks and rails, floors, floor covering, pipes and fittings, siding, trim, windows, doors, molding, and wall coverings), consumer goods and parts for consumer goods (such as, but not limited to, power hand tools, rakes, shovels, lawn mowers, shoes, boots, golf clubs, fishing poles, and watercraft), healthcare equipment (including, but not limited to, wheelchairs, beds, testing equipment, analyzers, labware, ostomy, IV sets, wound care, drug delivery, inhalers, and packaging). In short, the polymeric products described herein can be used to make the items currently made from conventional petroleum-based polymers.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Experimental Methods

Materials

The PHA and PBS polymers utilized in the blend examples along with their composition are summarized in Table 1. The PHA was a copolymer of 3-hydroxybutyrate and 4-hydroxybutyrate (P3HB-4HB) having a weight percent 4-hydroxybutyrate of 40-50%. The melt flow index (MFI) and % biobased content are also shown in the table for the PHA. The PBS used in the examples was BIONOLLE™ MD1001 from Showa Denko. Its MFI is also shown in the table.

TABLE 1

Summary of polymers used in examples.

| Polymer ID | MFI@190° C., 2.16 kg/10 min | Weight % 4HB | Measured % Biobased Content |
|---|---|---|---|
| PHA | 0.2-0.4 | 40-50 | 99 |
| PBS BIONOLLE™ MD1001 | 1-2 | — | — |

Preparation of PBS/PHA Blend Samples

Poly-butylene-succinate (PBS)/polyhydroxyalkanoate (PHA) samples with 15% by weight calcium carbonate were prepared by melt blending PBS with the PHA using a 26 mm Coperion co-rotating twin screw extruder with ten heated barrel zones set at the following temperatures from inlet to exit: 170° C./180-190° C./180-185° C./170-180° C./160-170° C./150-170° C./150° C./150° C./165° C./150° C. The die at the extruder exit was maintained at a temperature of 200° C. in order to facilitate pelletization of the blends. Blended pellets of PBS/PHA were prepared with weight percent PHA of 12%, 17% and 36%. Once pelletized, plaques of the blends at thickness 0.4 mm were prepared by compression molding using a Carver Press set at 166° C. Thinner blown films of thickness 0.025 mm were also prepared for each blend by using a 1.5 inch 24:1 Davis Standard extruder fitted with a 2.5 inch spiral mandrel die, having a die gap of 60 mil, and a Future Design dual-lip air ring. The temperature setting on the extruder was 191° C./185° C./182° C. The adapter zones were set to 182° C./182° C. and the die zones were set to 182° C./182° C./182° C. The extruder was operated at 40 rpm. The films collected were 0.025 mm in thickness with a blow up ratio of 2.55:1 which formed a tube with a lay flat width of about 10 inches.

Compression molded plaques of 0.4 mm thickness for 100% PHA and 100% PBS were also prepared.

Measurement of PBS/PHA Biodegradation Rate

The disintegration rate of the polymer films and plaques were measured in soil at room temperature (23° C.). Plastic trays with lids (1.5 ft×2 ft×5 inches) were filled with 10 lbs of loam that were sifted through a 5.5 mm sieve. Distill water was added to the trays at 10-15% by weight and mixed into the soil. A digital moisture probe was used to check the moisture level every few days and more water added over time as needed. Samples were cut from the PBS/PHA films and plaques using a rectangular punch that was 63 mm×73 mm. At time equal to zero, eight to ten samples were positioned underneath the soil in each tray so that at least two inches of soil were covering each sample and no samples were in contact with each other. After each week, the samples were removed, washed in gently running water, air dried over night for a minimum of 16 hours and then weighed using a four place METTLER™ balance. After weighing the samples, were then placed back into the soil to continue biodegrading. The test was stopped when the films or plaques had disintegrated to the point where the films were too weak or fragmented to remove from the trays. The rate of biodegradation of the blend sample was calculated as the percent total weight loss of the sample divided by time the sample was in soil (months). This value was then normalized to a 1 mil film thickness by multiplying the biodegradation rate by the film thickness (mils). Additionally, the weight of the filler in the sample was subtracted from the final weight of sample in order to calculate percent weight loss of the polymer only. The units on the biodegradation rate data were therefore % weight loss of polymer per month for a 1 mil film.

Measurement of Polymer Molecular Weight

Melt flow index (MFI) was used to evaluate the molecular weight of the PHA and PBS polymers. Melt flow index measures the weight of polymer extruded from a heated barrel through a die, under an applied load over a period of 10 minutes. For these measurements, the barrel temperature used was 190° C. with a load of 2.16 kg. A typical MFI instrument to make these measurements is the INSTRON™ MF20 melt flow indexer. MFI is inversely proportional to the molecular weight of a polymer i.e. the higher the molecular weight, the lower the MFI value will be.

Measurement of PHA Composition

The weight percent 4-hydroxybutyrate contained in the PHA copolymers was determined by acid alcoholysis followed by GC-FID analysis. A 10-15 mg sample of the dry copolymer was first weighed in to a test tube. Then 2-5 ml of a reagent containing n-butanol (99%, EMD), 4M HCl in dioxane (Sigma Aldrich) and the internal standard diphenylmethane was pipetted in to the test tube. The test tube was capped and heated at 93° C. for 6 hours using a heater block. After the alcoholysis reaction was completed, the test tube contents were cooled to room temperature and 2-5 ml of DI water was added. The mixture was centrifuged and the organic top layer was pipetted out of the test tube and into a GC vial. The GC vial contents were then run on an Agilent Technologies, Model 6890N, GC-FID System having a ZB-35 30 m×0.25 mm×0.25 μm GC-FID column (Phenomenex). Standards for quantitating the weight %4HB in the copolymer were also prepared using γ-butyrolactone (99%, Sigma Aldrich).

Measurement of Biobased or Renewable Carbon Content

The biobased content or percent $^{14}C$ carbon (renewable carbon) relative to the total carbon in the PHA resin was measured by the radiocarbon dating method according to ASTM D6866.

Example 1. Effect of PHA Content on the Biodegradation Rate of PB S/PHA Blends

In this example, PBS/PHA blends were prepared having from 12-36% by weight PHA, 15% calcium carbonate and the balance PBS polymer. The samples were then tested in the soil disintegration test over a period of one to several months. Included in this evaluation were samples of 100% by weight PHA and PBS. The biodegradation rate after testing was then calculated as percent weight loss of polymer per month for a 1 mil film. Table 2 shows a summary of the sample formulations, film thicknesses and biodegradation rates measured.

As used herein, the term "reference composition" means a composition that is the same as the tested or claimed composition with the exception that it does not include the 3HB copolymer.

TABLE 1

Summary of PBS/PHA blend formulations and their biodegradation rates in soil @23° C.

| Sample ID | Wt % PHA | Wt % PBS | Wt % Filler | Sample Thickness (mm) | Soil Biodegradation Rate for 1 mil Film (% Wt loss/month) |
|---|---|---|---|---|---|
| 1 | 0 | 100 | 0 | 0.4 | 9 |
| 2 | 12 | 73 | 15 | 0.025 | 70 |

TABLE 1-continued

Summary of PBS/PHA blend formulations and their biodegradation rates in soil @23° C.

| Sample ID | Wt % PHA | Wt % PBS | Wt % Filler | Sample Thickness (mm) | Soil Biodegradation Rate for 1 mil Film (% Wt loss/month) |
|---|---|---|---|---|---|
| 3 | 12 | 73 | 15 | 0.025 | 55 |
| 4 | 12 | 73 | 15 | 0.025 | 48 |
| 5 | 17 | 68 | 15 | 0.4 | 172 |
| 6 | 17 | 68 | 15 | 0.4 | 146 |
| 7 | 17 | 68 | 15 | 0.4 | 102 |
| 8 | 17 | 68 | 15 | 0.4 | 71 |
| 9 | 36 | 49 | 15 | 0.03 | 227 |
| 10 | 100 | 0 | 0 | 0.25 | 455 |

The data in table shows that as the weight % PHA increased in the PBS/PHA blend, the soil biodegradation rate also increased in a linearly way. At the highest addition of PHA (36% by weight), the biodegradation rate of the PBS blend has increased by a factor of 25 as compared to the pure PBS sample. The linear increase in biodegradation is a surprising result as the PBS and PHA are immiscible polymers. Therefore the morphology of the samples likely is one where the PHA exists as discrete domains within the PBS matrix. Since the first step in biodegradation is attachment of soil microbes to the surface of blend samples, the PHA discrete domains should have little or no effect on the overall biodegradation rate. However the data shows that even for the samples with PHA added at 12% by weight, the PBS biodegradation rate increased by an average factor of approximately 6.5. This shows that the PHA additive was able to control the biodegradation rate of the PBS thereby producing a film with the ability to modulate the biodegradation properties.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:

1. A biodegradable polymer composition, comprising a blend of
   a succinate copolymer selected from polybutylene-succinate and polybutylene-succinate-adipate; and
   a 3-hydroxybutyrate (3HB) copolymer,
   wherein the 3HB copolymer is poly-3-hydroxybutyrate-co-4-hydroxybutyrate,
   wherein the 3HB copolymer has at least 90% renewable carbon content as measured by ASTM D6866, and
   wherein the content of 4-hydroxybutyrate in the 3HB copolymer is about 40% to about 50% by weight of the 3HB copolymer,
   and further wherein:
   the content of the 3HB copolymer in the polymer composition is from about 1% to about 40% by weight of the composition, and
   the biodegradation rate of the polymer composition is at least two times faster than the biodegradation rate of a reference composition containing no 3HB copolymer
   wherein the 3HB copolymer has a melt flow index of 0.2 to 0.4 and the succinate copolymer has a melt flow index of 1 to 2;
   wherein the melt flow index is measured at 190° C., 2.16 kg/10 min.

2. The biodegradable polymer composition of claim 1, wherein the 3-hydroxybutyrate copolymer has a molecular weight of about 500,000 to about 1,500,000 daltons as measured by gel permeation chromatography, and a glass transition temperature as measured by differential scanning calorimetry of −5 to −50° C.

3. The biodegradable polymer composition of claim 1, wherein the 3-hydroxybutyrate copolymer has a molecular weight of about 550,000 to about 750,000 daltons as measured by gel permeation chromatography, and a glass transition temperature as measured by differential scanning calorimetry of −10 to −30° C.

4. The biodegradable polymer composition of claim 1, wherein the polymer composition further comprises a third biodegradable polymer.

5. The biodegradable polymer composition of claim 1, further comprising a nucleating agent selected from one or more of the following carbon black, cyanuric acid, uracil, thymine, mica talc, silica, boron nitride, barium nitride, clay, calcium carbonate, synthesized silicic acid and salts, metal salts of organophosphates, and kaolin.

6. The biodegradable polymer composition of claim 1, wherein the content of 4-hydroxybutyrate in the 3HB copolymer is about 35% to about 50% by weight of the 3HB copolymer.

7. The biodegradable polymer composition of claim 1, wherein the 3HB copolymer comprises an amorphous rubber phase having no melting point.

8. The biodegradable polymer composition of claim 1, further comprising one or more additives.

9. The biodegradable polymer composition of claim 8, wherein the additive is selected from one or more of a plasticizer, a clarifier, a nucleating agent, a thermal or oxidative stabilizer, an inorganic filler, an anti-slip agent, a compatibilizer, a blocking agent, and a pigment.

10. The biodegradable polymer composition of claim 1, wherein the 3HB copolymer is prepared by culturing a recombinant host with a renewable feedstock to produce a biobased poly-3-hydroxybutyrate-co-4-hydroxybutyrate biomass.

11. The biodegradable polymer composition of claim 10, wherein a source of the renewable feedstock is selected from glucose, fructose, sucrose, arabinose, maltose, lactose, xylose, glycerol, ethanol, methanol, fatty acids, vegetable oils, and biomass derived synthesis gas or a combination thereof.

12. A film or multilayer laminate comprising at least one film, said film comprising the biodegradable polymer composition of claim 1.

13. The multilayer laminate of claim 12, wherein the film has a thickness of about 1 to about 2 microns.

14. A method of preparing the biodegradable polymer composition of claim 1, the method comprising melt-blending the blend, the blend comprising:
   the succinate copolymer selected from polybutylene-succinate and polybutylene-succinate-adipate;
   and
   the 3-hydroxybutyrate (3HB) copolymer,
   wherein the 3HB copolymer is poly-3-hydroxybutyrate-co-4-hydroxybutyrate,
   wherein the 3HB copolymer has at least 90% renewable carbon content as measured by ASTM D6866,
   and
   wherein the content of 4-hydroxybutyrate in the 3HB copolymer is about 40% to about 50% by weight of the 3HB copolymer,
   and further wherein the content of the 3HB copolymer in the polymer composition is from about 1% to about 40% by weight of the composition, and the biodegradation rate of the polymer composition is at least two times faster than the biodegradation rate of a reference composition containing no 3HB copolymer wherein the 3HB copolymer has a melt flow index of about 0.2 to about 0.4 and the succinate copolymer has a melt flow index of about 1 to about 2;

wherein the melt flow index is measured at 190° C., 2.16 kg/10 min.

15. An article comprising the biodegradable polymer composition of claim 1.

16. The article of claim 15, comprising a foam, woven fibers, nonwoven fibers, a thermoformed part, or an injection molded part.

\* \* \* \* \*